United States Patent
Rosenberg et al.

(10) Patent No.: US 10,697,781 B2
(45) Date of Patent: Jun. 30, 2020

(54) GPS-BASED AREA RECOGNITION IN VEHICLES

(71) Applicant: FORD GLOBAL TECHNOLOGIES, LLC, Dearborn, MI (US)

(72) Inventors: Stephanie Rosenberg, Huerth (DE); Maria Strackbein, Cologne (DE); Sascha Haase, Wermelskirchen (DE); Timur Daniel Oemer Pulathaneli, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 15/458,451

(22) Filed: Mar. 14, 2017

(65) Prior Publication Data
US 2017/0276490 A1 Sep. 28, 2017

(30) Foreign Application Priority Data

Mar. 26, 2016 (DE) .................... 10 2016 204 823

(51) Int. Cl.
*G01C 21/26* (2006.01)
*G01C 21/32* (2006.01)
(Continued)

(52) U.S. Cl.
CPC .......... *G01C 21/32* (2013.01); *G01C 21/3469* (2013.01); *G01S 19/45* (2013.01)

(58) Field of Classification Search
CPC . G08G 1/123; G05D 1/00; G05D 1/02; G01C 21/32; G01C 21/34
(Continued)

(56) References Cited

U.S. PATENT DOCUMENTS 5,948,043 A 9/1999 Mathis
9,558,584 B1 * 1/2017 Lo ...................... G06T 15/205
(Continued)

OTHER PUBLICATIONS

German Search Report dated Nov. 10, 2016 for German Application No. 102016204823.6, 8 pgs.
(Continued)

*Primary Examiner* — Thomas G Black
*Assistant Examiner* — Wae L Louie
(74) *Attorney, Agent, or Firm* — Frank MacKenzie; Brooks Kushman P.C.

(57) ABSTRACT

The disclosure relates to a method for determining by means of numeric geoposition data that specify the current geoposition of a vehicle, and digital maps that contain area polygons, which in each case represent a geographic area on the earth, in the vehicle in which of the various areas the vehicle is currently located. According to the disclosure, a boundary precheck is initially performed, wherein candidate area polygons are selected, which are located in the vicinity of the current vehicle position. The selected candidate area polygons are subjected successively to a PIP test in order to determine whether the current vehicle position is located in one of the corresponding areas. An initial variable is generated, which specifies whether the vehicle is currently located in an area, and possibly in which of the areas the vehicle is currently located, and the initial variable is supplied to at least one driver assistance system of the vehicle.

20 Claims, 2 Drawing Sheets

(51) Int. Cl.
*G01C 21/34* (2006.01)
*G01S 19/45* (2010.01)

(58) Field of Classification Search
USPC .............................. 701/123, 446, 457, 532
See application file for complete search history.

(56) References Cited

U.S. PATENT DOCUMENTS

| | | | | |
|---|---|---|---|---|
| 9,791,292 | B2* | 10/2017 | Beyeler | G01C 21/3682 |
| 9,885,582 | B2* | 2/2018 | Beyeler | G01C 21/3682 |
| 2001/0024203 | A1* | 9/2001 | Yamada | G01C 21/32 |
| | | | | 345/428 |
| 2007/0083325 | A1* | 4/2007 | Baba | G01C 21/367 |
| | | | | 701/457 |
| 2010/0262359 | A1* | 10/2010 | Motoyama | G01C 21/32 |
| | | | | 701/532 |
| 2012/0012367 | A1 | 1/2012 | Makino et al. | |
| 2012/0123677 | A1 | 5/2012 | Shimotani et al. | |
| 2014/0278038 | A1* | 9/2014 | Stankoulov | G01C 21/3469 |
| | | | | 701/123 |
| 2014/0372024 | A1* | 12/2014 | Lee | G01C 21/005 |
| | | | | 701/446 |
| 2015/0012207 | A1* | 1/2015 | Tate, Jr. | G01C 21/00 |
| | | | | 701/123 |
| 2017/0018184 | A1* | 1/2017 | Northrup | G08G 1/144 |
| 2017/0090479 | A1* | 3/2017 | Wilcox | H04W 4/029 |
| 2017/0098129 | A1* | 4/2017 | Lo | G06T 15/205 |
| 2017/0230790 | A1* | 8/2017 | Skomra | G06Q 10/08 |
| 2017/0285655 | A1* | 10/2017 | Katou | G09B 29/00 |
| 2018/0024549 | A1* | 1/2018 | Hurd | H04W 4/021 |
| | | | | 701/2 |

OTHER PUBLICATIONS

Adam, Nabil R. et al., "Database Issues in Geographic Information Systems", Representation and Manipulation of Spatial Data, p. 39, Oct. 31, 2012, Springer US, Boston, MA.
EP Search Report for EP17159608.3 dated Sep. 8, 2017, 7 pgs.

* cited by examiner

GPS-BASED AREA RECOGNITION IN VEHICLES

CROSS-REFERENCE TO RELATED APPLICATIONS

This application claims foreign priority benefits under 35 U.S.C. § 119(a)-(d) to DE 10 2016 204 823.6 filed Mar. 23, 2016, which is hereby incorporated by reference in its entirety.

TECHNICAL FIELD

The disclosure relates to a method for determining the current geoposition of a vehicle, and digital maps, which in each case represent a geographic area on the earth.

BACKGROUND

Some of the various driver assistance systems in modern motor vehicles operate in dependence on the environment in which the vehicle is currently located, and the functional accuracy and availability of such driver assistance systems can be improved by information from a navigation system, for example by information regarding in which state or other geographic area the motor vehicle is currently located in order to provide for a country- or area-specific system behavior.

If a motor vehicle contains a navigation system that matches the geoposition of the vehicle continuously to a digital map, area information for driver assistance systems can also be easily obtained, namely as an area code, e.g. a country identifier, for the road currently traveled.

Navigation systems that utilize GPS ("Global Positioning System") data calculate the current vehicle position very accurately in geocoordinates, that is to say as absolute position and much more accurately than is actually necessary for supporting driver assistance systems.

Navigation systems are frequently not part of the standard equipment of motor vehicles and even if this is the case, the driver should keep the ability of deactivating the navigation.

The disclosure is based on the object of determining in a vehicle, with as little expenditure as possible but with adequate accuracy, in which geographic area the vehicle is currently located in order to safeguard the performance and availability of driver assistance systems if no navigation system is available in the vehicle or if it is currently not in operation.

SUMMARY

According to the disclosure, a boundary precheck is initially performed, wherein candidate area polygons are selected that are located in the vicinity of the current vehicle position. The selected candidate area polygons are then successively subjected to a PIP ("Point-In-Polygon") test in order to determine whether the current vehicle position is located in one of the corresponding areas. To at least one driver assistance system of the vehicle, an initial variable is supplied, which specifies whether the vehicle is currently located in an area and possibly in which of the areas the vehicle is currently located.

The disclosure makes use of the circumstance that in most motor vehicles, at least one receiver for global navigation satellite systems ("GNSS") is installed as standard, a device that can determine its own geographic position from the satellite signals. Such GPS or related position determining devices are even prescribed with the introduction of the automatic emergency call system for motor vehicles ("eCall") and will not be easily deactivatable.

Although GNSS devices supply only the absolute geoposition as pure numerical values, it is possible by means of the disclosure to obtain area information from them with minimum storage and computing expenditure, which is accurate enough for driver assistance systems.

The method according to the disclosure only needs a minimal set of geographic map data with correspondingly little storage requirement and can be performed as software, which can run on a so-called "Embedded Platform". The computing times are predeterminable and less than in the case of an accurate position determination.

On the other hand, the method according to the disclosure is significantly more accurate than mere position estimations but faster by a multiple and more resource-saving than usual navigation systems. The latter is also caused by the fact that only the relative positions of vehicle and area polygons have to be determined for the disclosure.

The method according to the disclosure is to a certain degree related to so-called geofencing algorithms, which trigger an action when an imagined boundary on the earth is crossed. The algorithms used for this purpose have no predetermined computing times, however, and do not need as little storage space and cannot be implemented as simply as the present disclosure.

US 2001 024 203 A1, US 2012 123 677 A1 and US 2007 083 325 A1 disclose map display or movement devices wherein, however, other algorithms are used for polygon processing than in the case of the present disclosure. In addition, the disclosure does not require any map display devices.

In a preferred embodiment of the present disclosure, the boundary precheck is performed by greater or less than comparisons of the values of a first coordinate of the current vehicle position with the maximum or minimum coordinate values, respectively, of the area polygons contained in the digital maps with respect to the first coordinate and by greater or less than comparisons of the values of a second coordinate, orthogonal to the first coordinate, of the current vehicle position with the maximum or minimum coordinate values, respectively, of the area polygons with respect to the second coordinate.

In preferred embodiments, the PIP tests are performed without point of intersection calculations by means of greater or less than comparisons of coordinate values after a suitable coordinate displacement that significantly reduces the computing expenditure.

In a development of the disclosure, the candidate area polygons selected by means of the boundary precheck are subdivided into smaller part-polygons by superimposing parallel strips. Furthermore, by means of a binary search, a strip is determined into which the current vehicle position falls and the part-polygons falling into the strip determined are then subjected to the PIP tests. This lowers the computing expenditure even more.

The geographic areas are preferably administrative or similar areas that change only in exceptional cases. For this reason, no frequent updating of the digital maps is required.

As described, the method according to the disclosure is particularly suitable for vehicles, particularly motor vehicles, wherein a receiver for a global navigation satellite system supplying the geoposition data, but no navigation system, is installed and that have at least one driver assistance system.

A description of exemplary embodiments by means of the drawings follows, in which:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The system described in the text which follows is called GPS-based area recognition.

A GNSS receiver installed in a motor vehicle supplies raw data, which specify the geographic coordinates of the vehicle as its GPS position or generally geoposition. In addition, a digital map is stored in the vehicle which exclusively represents coherent geographic and/or administrative areas on the earth as more or less gaplessly adjoining polygons that represent relevant area boundaries or are approximated to these.

On the basis of the geoposition data, it is determined at regular time intervals such as, e.g. every pair of seconds, in which of the geographic or administrative areas the vehicle is currently located.

Figure 1:
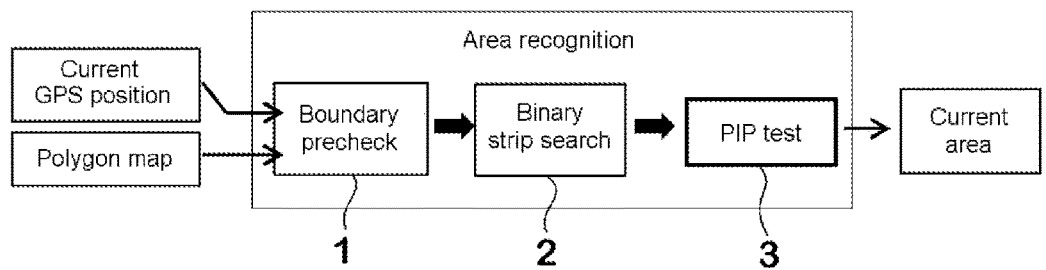
FIG. 1 shows a block diagram of a method for determining in which geographic area a vehicle is currently located.

For this purpose, the area recognition method shown in an overview in FIG. 1 is performed by means of hardware and software present in the vehicle.

By means of the geoposition data and the polygon map data as input variables, a boundary precheck is performed in a block 1, by which means, among all stored area polygons, those are selected, which, due to their vicinity to the current vehicle position, are candidates for an area in which the vehicle is currently located.

In a first exemplary embodiment, the candidate area polygons identified in block 1 are successively subjected to a Point-In-Polygon test (PIP test) in block 3 in order to find out whether the current vehicle position is located in the tested area and the area determined as currently fitting, or an identifier of it, is the initial variable supplied to a driver assistance system of the motor vehicle.

In a second exemplary embodiment, each candidate area polygon identified in block 1 is firstly subdivided in block 2, by superimposing many parallel strips, which extend along a predetermined coordinate axis, into smaller part-polygons. By means of a binary search, an algorithm known in the prior art which very efficiently finds an element sought in a list, that strip is determined into which the current vehicle position falls. The part-polygons of all candidate area polygons, falling into the respective strips, are then successively subjected to a PIP test in block 1 in order to find out whether the current vehicle position is located in the part-polygon checked.

Blocks 1 to 3 will be described in greater detail in the text which follows.

Figure 2:
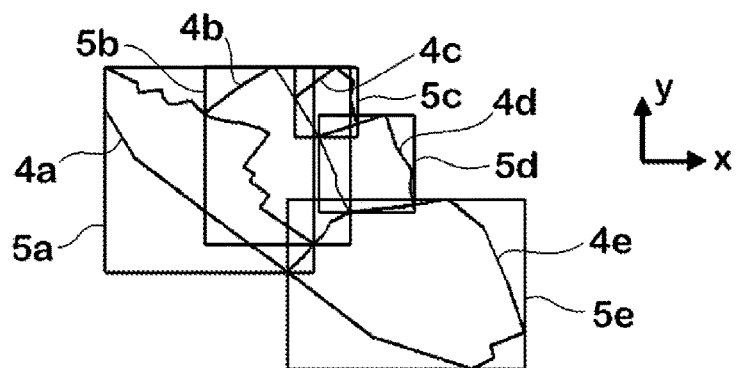
FIG. 2 shows a drawing for explaining the delimitation block in FIG. 1.

The boundary precheck in block 1 of FIG. 1 is performed since the number of areas to be distinguished is normally high. As shown in FIG. 2, a fitting rectangular boundary box $5a, 5b, 5c, 5d, 5e$, the coordinates of which are e.g. simply given by the smallest and largest x or y coordinates of the corresponding area polygon $4a, 4b, 4c, 4d, 4e$ in an x-y coordinate system is drawn around each area polygon, wherein here only five area polygons $4a, 4b, 4c, 4d, 4e$ are represented.

Thus, it is possible to check in the simplest way into which of the boundary boxes $5a, 5b, 5c, 5d, 5e$ the geoposition of the vehicle falls, namely by greater or less than comparisons of the values of a first coordinate of the current vehicle position with the corresponding maximum or minimum coordinate values, respectively, of the area polygons $4a, 4b, 4c, 4d, 4e$ and by greater or less than comparisons of the values of a second coordinate, orthogonal to the first coordinate, of the current vehicle position with the corresponding maximum or minimum coordinate values, respectively, of the area polygons $4a, 4b, 4c, 4d, 4e$, wherein the coordinates can be optionally cartesian x-y coordinates or polar coordinates.

All area polygons which belong to a boundary box into which the geoposition of the vehicle falls are candidate polygons, i.e. possible candidates for an area in which the vehicle is currently located. All other area polygons do not need to be checked further.

The PIP test in block 3 of FIG. 1 is an optimized so-called ray method for checking whether a point is located inside or outside a polygon. In the ray method, a test ray is drawn in an arbitrary direction from a point to be tested and it is counted how often the test ray intersects the edges of the polygon. If the number of points of intersection of the test ray with the polygon edges is odd, the point is located inside the polygon and otherwise outside of it. The corresponding decision rule can be written as:

$$\operatorname{cn}(P, p) \bmod 2 = \begin{cases} 0 \rightarrow p \in P \\ 1 \rightarrow p \in P \end{cases}$$

Figure 3:
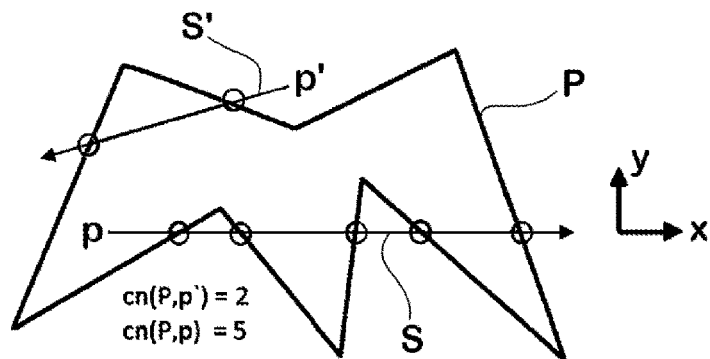
FIG. 3 shows a drawing for explaining the PIP test block in FIG. 1.

FIG. 3 illustrates an example of a corresponding PIP test with respect to a point p that is within a polygon P, and with respect to a point p' that is outside the polygon P. Exemplary test rays emanating from points p and p' are drawn as S and S', and their points of intersection with the polygon edges as small circles.

The most extensive computing steps in the ray method are the calculations of the points of intersection. The optimized ray method proposed here operates without point of intersection calculations by using improved greater or less than comparisons of coordinate values as described in the text which follows.

Firstly, the coordinate system is displaced in such a way that the current position of the vehicle is at the origin. The test ray can then be defined as the positive x axis of a cartesian x-y coordinate system. Extensive point of intersection calculations can be avoided since it is not necessary to know the precise point of intersection, but only whether the polygon edge intersects the positive half of the x axis. This can be performed in three simple steps as described in the text which follows.

Let $v_i=(x_i, y_i)$ and $v_j=(x_j, y_j)$ be the displaced vertices of the checked polygon edge. An inside/outside condition can be formulated as follows:

1) Discard all edges that do not meet the following condition:

sign $(y_i) \neq$ sign $(y_j)$

2a) Store the occurrence of a point of intersection if an edge meets the following condition:

sign $(x_i)>0$ && sign $(x_j)>0$

2b) The edge is to be discarded if:

sign $(x_i)<0$ && sign $(x_j)<0$

3) Also store the occurrence of a point of intersection for edges, wherein b is the y-axis section of the edge in the displaced coordinate system:

$$(x_i * y_i * b) < 0$$

With the greater or less than comparisons, the PIP test performed is very efficient. There only remains one division left over (in the calculation of b).

The above calculation can be performed, instead of in a cartesian x-y coordinate system, also in a polar coordinate system.

Figure 4:
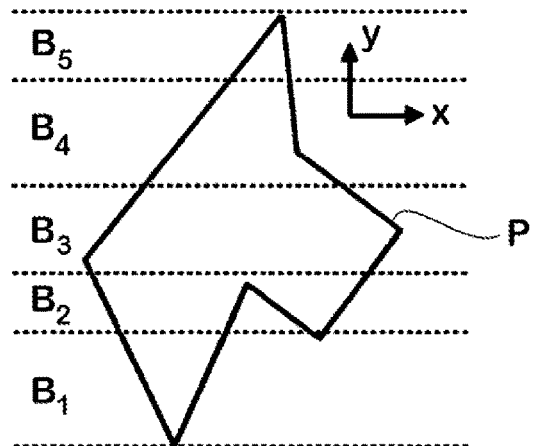
FIG. 4 shows a drawing for explaining the strip/binary search block in FIG. 1.

The optional binary strip search in Block 3 of FIG. 1 is particularly suitable for cases in which the individual area polygons of a polygon map have very many or a very different number of edges. For this purpose, the area polygons or at least those having very many edges are subdivided into smaller part-polygons, which in each case contain approximately the same number of polygon edges and are here called strips or bins. In the example shown in FIG. 4, one polygon P is split into smaller part-polygons by five strips $B_1$ to $B_5$.

The edges contained in an individual strip are interpreted and treated as independent polygons. In this way, area polygons, which naturally have different sizes and shapes, are scaled to polygons of approximately the same size. The performance of the PIP tests on smaller pieces can be administered better and the computing time is less dependent on the polygon size and shape.

Before performing the PIP tests or point of intersection tests, the strip must be determined into which the current vehicle position falls. This can be done by a so-called binary search, which reduces the complexity O (n) when testing n strips in chronological order to O (log n).

Figure 5:
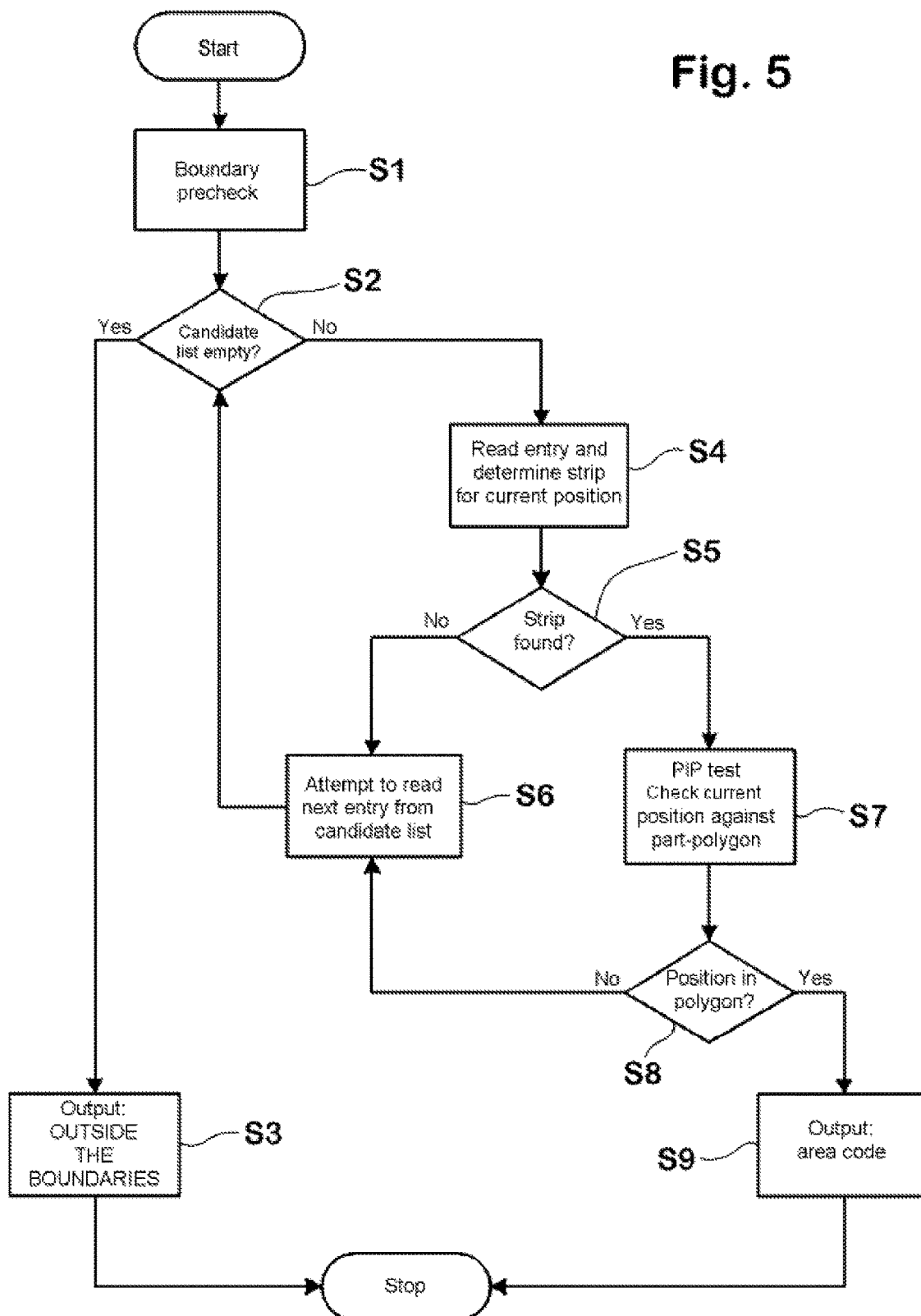
FIG. 5 shows a flowchart of the method for determining in which geographic area the vehicle is currently located.

The second exemplary embodiment of the method for determining in which geographic area a vehicle is currently located is also shown as a flowchart in FIG. 5. The method can then be started cyclically and begins in each case with step S1, to perform a boundary precheck as in block 1 of FIG. 1 and enter candidate polygons determined into a list.

If it is found in step S2 that the list of candidate polygons is empty, the result of the method is output in step S3 that the current vehicle position is not located in any area of the digital map, and the method ends. Otherwise, an entry is read out of the list of candidate polygons in step S4 and by means of the binary strip search, a search is conducted for a strip for the current vehicle position by means of the binary strip search in block 2 of FIG. 1.

In step S5, it is checked whether there is a corresponding strip, and if not, it is effected in step S6 that in step S4, the next entry, if present, is read out of the list of candidate polygons and supplied to step S5.

If a strip has been found in step S5, the part polygon contained therein is subjected to the PIP test in block 3 of FIG. 1 in step S7. If it is found in step S8 that the current vehicle position is not in the part polygon, it returns to step S6 and if it is there, an area code is output as a result in the method in step S9 that is allocated to the area polygon in which the part-polygon is located.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for determining, via numeric geoposition data that specify a current geoposition of a vehicle and digital maps that contain area polygons that each represent a geographic area, an area the vehicle is currently located, comprising:

an embedded processor performing a boundary precheck by representing area polygons located in a vicinity of a current vehicle position as rectangular areas that correspond to each of the area polygons and are bounded by maximum and minimum coordinates of the area polygons and selecting candidate area polygons as the area polygons corresponding to the rectangular areas that contain the current geoposition;

successively subjecting the candidate area polygons to a PIP test to determine whether the current vehicle position is located in one of a corresponding area with the candidate area polygons; and supplying, to at least one driver assistance system, an initial variable that specifies whether the vehicle is currently located in an area and in the corresponding areas the vehicle is currently located.

2. The method as claimed in claim 1, wherein the boundary precheck includes performing first greater or less than value comparisons of a first coordinate of the current vehicle position with maximum or minimum coordinate values, respectively, of the area polygons with respect to the first coordinate, and performing second greater or less than value comparisons of a second coordinate, orthogonal to the first coordinate, of the current vehicle position with maximum or minimum coordinate values, respectively, of the area polygons with respect to the second coordinate.

3. The method as claimed in claim 1, wherein the PIP tests are performed without point of intersection calculations using greater or less than comparisons of coordinate values.

4. The method as claimed in claim 1, wherein the candidate area polygons are subdivided into smaller part-polygons by superimposing parallel strips, wherein, via a binary search, a strip is determined into which the current vehicle position falls, and wherein only the part-polygons corresponding to the strip determined are subjected to the PIP tests.

5. The method as claimed in claim 1, wherein the geographic areas are administrative areas.

6. The method as claimed in claim 1 further comprising calculating, via the initial variable, an improvement potential with respect to fuel consumption or with respect to a range that is achieved with a given quantity of fuel.

7. The method as claimed in claim 6 further comprising displaying the improvement potential to a driver.

8. A vehicle comprising:

a receiver that supplies geoposition data for a navigation system; and a driver assistance system configured to, including an embedded processor programmed to in response to a boundary precheck performed by representing area polygons located in a vicinity of a current vehicle position as rectangular areas corresponding to each of the area polygons bounded by maximum and minimum coordinates of the area polygons and selecting candidate polygons as the area polygons corresponding to the rectangular areas that contain a current geoposition and successively subjecting the candidate polygons to a PIP test to determine a current vehicle position in a corresponding area within the candidate polygons, display a variable that specifies the current vehicle position.

9. The vehicle as claimed in claim 8, wherein the boundary precheck includes performing first greater or less than value comparisons of a first coordinate of the current vehicle position with maximum or minimum coordinate values, respectively, of the candidate polygons with respect to the first coordinate.

10. The vehicle as claimed in claim 9, wherein the boundary precheck includes performing second greater or less than value comparisons of a second coordinate, being orthogonal to the first coordinate, of the current vehicle position with maximum or minimum coordinate values, respectively, of the candidate polygons with respect to the second coordinate.

11. The vehicle as claimed in claim 8, wherein the PIP test is performed without point of intersection calculations using of greater or less than comparisons of coordinate values after a suitable coordinate displacement.

12. The vehicle as claimed in claim 8, wherein the candidate polygons are subdivided into smaller part-polygons by superimposing parallel strips, wherein, via a binary search, a strip is determined into which the current vehicle position falls, and wherein only the smaller part-polygons corresponding to the strip determined are subjected to the PIP test.

13. The vehicle as claimed in claim 8, wherein the driver assistance system is further configured to calculate, via the variable, an improvement potential with respect to fuel consumption or with respect to a range that is achieved by a given quantity of fuel.

14. A driver assistance system comprising:
an embedded processor programmed in response to a boundary precheck performed by representing area polygons located in a vicinity of a current vehicle position as rectangular areas corresponding to each of the area polygons bounded by maximum and minimum coordinates of the area polygons and selecting candidate polygons as those area polygons corresponding to the rectangular areas that contain a current geoposition value, determined via a receiver that supplies geoposition data for a navigation system; and
in response to successively subjecting the candidate polygons to a PIP test to determine a current vehicle position in a corresponding area within the candidate polygons, display a variable that specifies the current vehicle position.

15. The driver assistance system as claimed in claim 14, wherein the geoposition data relates to administrative areas.

16. The driver assistance system as claimed in claim 14, wherein the boundary precheck includes performing first greater or less than value comparisons of a first coordinate of the current vehicle position with maximum or minimum coordinate values, respectively, of the candidate polygons with respect to the first coordinate.

17. The driver assistance system as claimed in claim 16, wherein the boundary precheck includes performing second greater or less than value comparisons of a second coordinate, being orthogonal to the first coordinate, of the current vehicle position with maximum or minimum coordinate values, respectively, of the candidate polygons with respect to the second coordinate.

18. The driver assistance system as claimed in claim 14, wherein the PIP test is performed without point of intersection calculations using greater or less than comparisons of coordinate values after a suitable coordinate displacement.

19. The driver assistance system as claimed in claim 14, wherein the candidate polygons are subdivided into smaller part-polygons by superimposing parallel strips, wherein, via a binary search, a strip is determined into which the current vehicle position falls, and wherein only the smaller part-polygons corresponding to the strip determined are subjected to the PIP test.

20. The driver assistance system as claimed in claim 14 further comprising, an embedded processor programmed, in response to the display of the variable, calculate, via the variable, an improvement potential with respect to fuel consumption or with respect to a range that is achieved by a given quantity of fuel.

* * * * *